Figure 1:
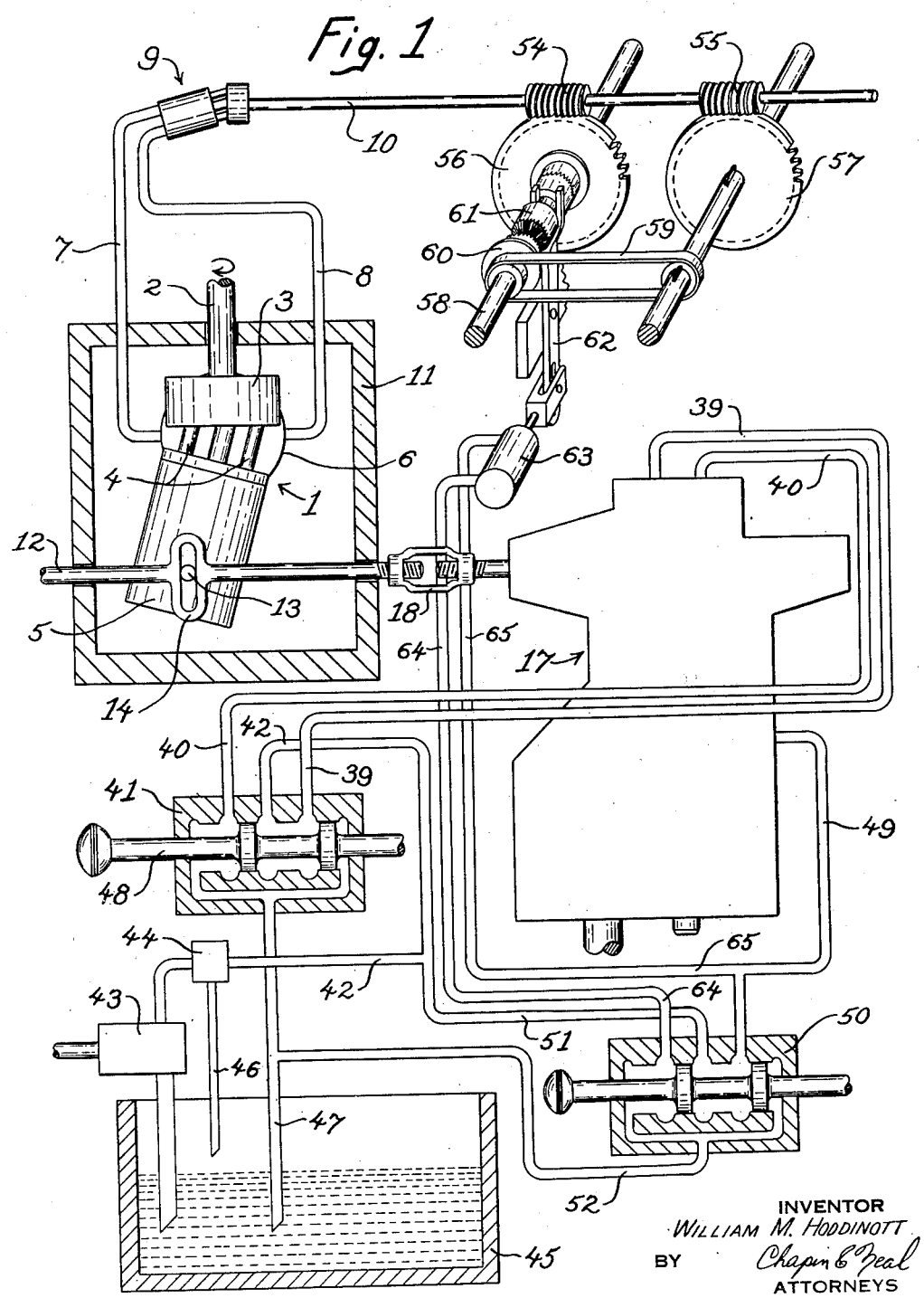

May 17, 1949.  W. M. HODDINOTT  2,470,617
CONTROL FOR VARIABLE DISPLACEMENT PUMPS
Filed Aug. 28, 1944  2 Sheets-Sheet 1

INVENTOR
WILLIAM M. HODDINOTT
BY Chapin & Neal
ATTORNEYS

May 17, 1949. W. M. HODDINOTT 2,470,617
CONTROL FOR VARIABLE DISPLACEMENT PUMPS
Filed Aug. 28, 1944 2 Sheets-Sheet 2

INVENTOR
WILLIAM M. HODDINOTT
BY Chapin & Neal
ATTORNEYS

Patented May 17, 1949

2,470,617

UNITED STATES PATENT OFFICE 2,470,617

CONTROL FOR VARIABLE DISPLACEMENT PUMPS

William M. Hoddinott, Springfield, Mass., assignor to Van Norman Company, Springfield, Mass., a corporation of Massachusetts Application August 28, 1944, Serial No. 551,466

4 Claims. (Cl. 103—38)

This invention relates to improvements in control mechanism for variable delivery pumps, particularly such as are employed as variable speed driving means for machine tools. In some types of machine tools, such as milling machines, it is necessary that the driven member be capable of moving at both feed and rapid traverse rates in both directions. In prior constructions this has been accomplished by the use of a reversing valve or by reversing the direction of the pump, neither of which are desirable on account of the added mechanism required. It is the object of this invention to produce a unitary control for a uni-directional variable delivery hydraulic pump, in which a change from rapid traverse to feed rate in either direction can be accomplished with no impairment in the accuracy of setting of the feed rate. A further object is to provide such a mechanism in which absolute equality of the feed rate in both directions can be maintained. Other objects will appear from the following description and claims.

Figure 2:
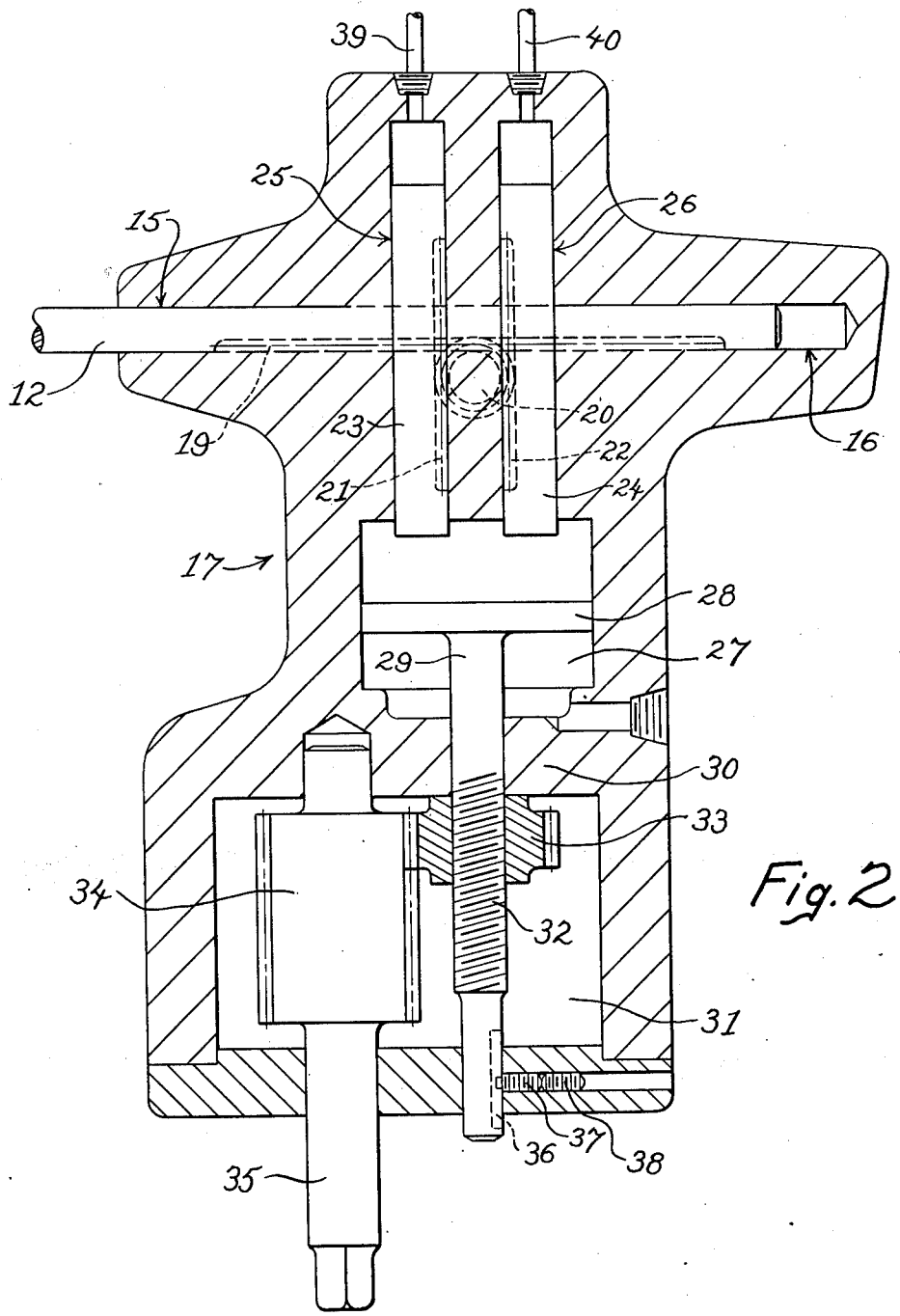

Referring to the drawings:

Fig. 1 is a diagrammatic view of a hydraulic circuit embodying the invention, and Fig. 2 is a section on an enlarged scale of the feed-rapid traverse pump control.

Referring first to Fig. 1, 1 indicates a variable delivery pump of standard type, in which a rotating shaft 2 drives a rotor 3 carrying pistons 4 extending into a plural cylinder member 5 rotatable into various angular positions about a pivot 6. Pipes 7, 8 connect the cylinder member, as for example through its pivot, with a suitable hydraulic motor which may be of the cylinder and piston type but is here shown as a rotating hydraulic motor 9 of a type generally similar to that of the pump. This motor drives a shaft 10 which may be connected directly to a screw shaft forming part of a table operating mechanism, but which is preferably coupled to said screw shaft through speed changing mechanism as will be described below. The pump 1 may be enclosed in an oil-flooded casing 11 to prevent loss of oil from the pump and provided with the usual means to insure that the entire system is flooded with oil at all times.

With the general type of pump shown, the direction of movement of the driven mechanism will be reversed by swinging the pivoted member 5 to one side or the other of its center, and its rate of movement controlled by the degree of displacement of that member. This degree of displacment is varied by shifting a rod 12 connected to a pin 13 on the member 5 by a link or by a slideway 14. This rod slides in bearings 15, 16 in a housing 17 (Fig. 2) which contains the control mechanism proper. In order to avoid the necessity for accurate placing of the housing, the rod 12 is preferably provided with a turnbuckle 18. The rod has rack teeth 19 which mesh with a long pinion 20 rotatably mounted in the housing 17. Also engaging with the pinion 20 and on opposite sides of it are rack teeth 21, 22 on rod pistons 23, 24 sliding snugly in cylindrical holes 25, 26 and each projecting at one end into a chamber 27 within the housing. This chamber acts as a cylinder for a piston 28 having its piston rod 29 extending through a wall 30 into a second chamber 31 and screwthreaded at 32. Threaded onto the rod 29 is a pinion 33 engaging a long gear 34 journaled in the housing and having a long shank 35 which may be adjusted by a wrench or other suitable means. When the piston 28 is forced upwardly by hydraulic pressure as will be described the pinion 33 will strike the upper portion of the chamber 31 and will limit the upward travel of the piston in accordance with the position of the piston on the screw threads 32 as determined by rotating the pinion by the shank 35. When the piston descends in the absence of hydraulic pressure underneath it its limit of motion is determined by its contact with wall 30. To prevent rotation of the screw threaded rod 29 it is slotted at 36 and held by a set-screw 37 clamped by a second set-screw 38.

Cylinders 25 and 26 are connected by piping 39 and 40 to a direction control valve 41 of customary type, which receives its pressure fluid through piping 42 from a constant delivery pump 43 provided with a relief valve 44 for return of excess fluid to the sump 45 through a line 46. A line 47 extends from the valve 41 to the sump. As the spindle 48 of the valve spool is shifted in one direction or the other the plungers 23, 24 will be alternately pushed down by hydraulic pressure, the inactive plunger having the pressure chamber above it vented to the sump through line 47. The effect of the movement of the plungers—one of which must go up as the other goes down on account of their mutual connection with pinion 20—is to shift the rod 12 in one direction or the other through a distance determined by the position of piston 28. If the piston is held up by hydraulic pressure the pump will be adjusted to feed rate, while if the piston is down the pump will be held in rapid traverse. The rapid traverse position may be the maximum eccentricity of the pump, while the feed position is determinable by adjustment of the shank 35.

To shift from rapid traverse to feed the chamber 27 below piston 28 is connected by a hydraulic line 49 to a conventional reversing valve 50, having a central connection through a pipe 51 with the pressure line 42 and end connections through a pipe 52 to the drainage line 47. In one position of the valve line 49 is connected to the pressure line, and in the other position to the sump. It is not necessary to provide a second hydraulic connection to move piston 28 downwardly, plungers 23 and 24 accomplishing this once pressure underneath the piston has been removed.

It is possible to increase the range between feed and rapid traverse still more by a change in gearing synchronized with the change in position of the pump. For this purpose the shaft 10 driven by the hydraulic motor 9 is provided with worms 54 and 55 meshing with worm wheels 56 and 57 respectively. The two worm and wheel combinations are made of different ratios, as by making 54, 56 a single and 55, 57 a quadruple thread. The wheel 57 of the latter will thus be driven at a higher speed than wheel 56. Wheel 56 is loose on a cross shaft 58, while wheel 57 is coupled as by a chain belt 59 with a sleeve 60 also loose on the shaft. A clutch member 61 is fixed to rotate with the shaft but slidable upon it, so that it may be shifted as by a rocker 62 to cause the shaft 58 to be driven at a high rate through train 55, 57, 59 or at a lower rate through train 54, 56. The rocker 62 is actuated by a hydraulic servomotor 63 connected to the upper end ports of valve 50 by pipes 64, 65. As valve 50 is shifted to either feed or rapid traverse positions the clutch 61 will be correspondingly shifted.

I claim:

1. A hydraulic drive comprising a variable delivery pump adjustable on both sides of neutral to preset feed and rapid traverse positions, and means for adjusting the pump comprising a rod, a pair of plungers connected to the rod to move it in opposite directions, a single abutment positioned to limit said movement of both said plungers, and means to shift said abutment between positions giving respectively a long and a short travel to the plungers.

2. A hydraulic drive comprising a variable delivery pump adjustable on both sides of neutral to preset feed and rapid traverse positions, and means for adjusting the pump comprising a rod, a pair of plungers connected to the rod to move it in opposite directions, a single abutment positioned to limit the movement of both said plungers, means to shift said abutment between positions giving respectively a long and a short travel to the plungers, and means for adjusting the second named position of the abutment independently of said shifting means.

3. A hydraulic drive comprising a variable delivery pump adjustable on both sides of neutral, and means for adjusting the pump comprising a rod, a pair of plungers connected to the rod to move it in opposite directions, a single abutment positioned to limit the movement of both said plungers, a threaded shank on said abutment, a stationary member through which the shank passes, means for holding the shank against rotation, a pinion threaded on the shank and adapted to contact the stationary member on the opposite side from the abutment, a long gear in constant mesh with the pinion, means to rotate the gear to change the position of the pinion on the shank, whereby the abutment may be shifted between positions determined respectively by contact of the abutment and contact of the pinion with said stationary member.

4. A hydraulic drive comprising a variable delivery pump adjustable on both sides of neutral to preset feed and rapid traverse positions, means for adjusting the pump, single means limiting the maximum adjustment of the pump in both directions, means for shifting said single means bodily to a position corresponding to a lesser pump delivery, and means independent of said shifting means for adjusting said latter position.

WILLIAM M. HODDINOTT.

REFERENCES CITED

The following references are of record in the file of this patent:

UNITED STATES PATENTS

| Number | Name | Date |
|---|---|---|
| 1,385,289 | Ward | Nov. 16, 1917 |
| 1,573,525 | Sandoz | Feb. 16, 1926 |
| 1,785,355 | Lawser | Dec. 16, 1930 |
| 1,929,185 | Ferris | Oct. 3, 1933 |
| 2,113,161 | Osborne | Apr. 5, 1938 |
| 2,114,443 | Foisy | Apr. 19, 1938 |
| 2,140,633 | Kocks | Dec. 20, 1938 |
| 2,142,500 | Douglas | Jan. 3, 1939 |
| 2,146,133 | Tweedale | Feb. 7, 1939 |
| 2,155,455 | Thoma | Mar. 25, 1939 |
| 2,240,898 | Weidmann | May 6, 1941 |
| 2,275,758 | Harris | Mar. 10, 1942 |
| 2,303,955 | Rose | Dec. 1, 1942 |